US009963771B2

(12) United States Patent
Suzuki

(10) Patent No.: US 9,963,771 B2
(45) Date of Patent: May 8, 2018

(54) HIGH-STRENGTH GALVANIZED STEEL SHEET

(71) Applicant: JFE STEEL CORPORATION, Tokyo (JP)

(72) Inventor: Yoshitsugu Suzuki, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days. days.

(21) Appl. No.: 15/519,348

(22) PCT Filed: Aug. 19, 2015

(86) PCT No.: PCT/JP2015/004136
§ 371 (c)(1),
(2) Date: Apr. 14, 2017

(87) PCT Pub. No.: WO2016/059741
PCT Pub. Date: Apr. 21, 2016

(65) Prior Publication Data
US 2017/0247783 A1    Aug. 31, 2017

(30) Foreign Application Priority Data
Oct. 17, 2014   (JP) .................. 2014-212143

(51) Int. Cl.
| C23C 2/06 | (2006.01) |
| C23C 2/26 | (2006.01) |
| C23C 2/40 | (2006.01) |
| B32B 15/01 | (2006.01) |
| B32B 15/18 | (2006.01) |
| C22C 38/12 | (2006.01) |
| C22C 38/04 | (2006.01) |
| C22C 38/06 | (2006.01) |
| C22C 38/00 | (2006.01) |
| C22C 38/02 | (2006.01) |
| C21D 9/46 | (2006.01) |
| C21D 8/02 | (2006.01) |

(Continued)

(52) U.S. Cl.
CPC ............... *C23C 2/06* (2013.01); *B32B 15/01* (2013.01); *B32B 15/012* (2013.01); *B32B 15/013* (2013.01); *B32B 15/04* (2013.01); *B32B 15/043* (2013.01); *B32B 15/18* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C23C 2/26* (2013.01); *C23C 2/28* (2013.01); *C23C 2/40* (2013.01); *C23C 28/02* (2013.01); *C23C 28/021* (2013.01); *C23C 28/023* (2013.01); *C23C 28/025* (2013.01); *C23C 30/00* (2013.01); *C23C 30/005* (2013.01); *C21D 2211/005* (2013.01); *C21D 2211/008* (2013.01); *Y10T 428/1259* (2015.01); *Y10T 428/12583* (2015.01); *Y10T 428/12611* (2015.01); *Y10T 428/12618* (2015.01); *Y10T 428/12757* (2015.01); *Y10T 428/12792* (2015.01); *Y10T 428/12799* (2015.01); *Y10T 428/12958* (2015.01); *Y10T 428/12972* (2015.01); *Y10T 428/12993* (2015.01); *Y10T 428/265* (2015.01); *Y10T 428/27* (2015.01)

(58) Field of Classification Search
CPC .... C23C 2/06; C23C 2/26; C23C 2/40; C23C 2/28; C23C 28/02; C23C 28/021; C23C 28/023; C23C 28/025; C23C 30/00; C23C 30/005; C21D 9/46; C21D 8/0236; C21D 8/0226; C21D 2211/008; C21D 8/0278; C21D 8/0263; C21D 2211/005; C22C 18/04; C22C 38/00; C22C 38/12; C22C 38/06; C22C 38/04; C22C 38/02; C22C 38/002; C22C 38/001; B32B 15/012; B32B 15/013; B32B 15/18; B32B 15/01; B32B 15/04; B32B 15/043; Y10T 428/12611; Y10T 428/12583; Y10T 428/1259; Y10T 428/12618; Y10T 428/12757; Y10T 428/265; Y10T 428/27; Y10T 428/12792; Y10T 428/12799; Y10T 428/12972; Y10T 428/12993; Y10T 428/12958

See application file for complete search history.

(56) References Cited

U.S. PATENT DOCUMENTS

2015/0337427 A1*  11/2015  Suzuki ................. C23C 2/06
                                                            428/659

FOREIGN PATENT DOCUMENTS

JP    2004-315965 A    11/2004
JP    2010534278 A     11/2010
(Continued)

OTHER PUBLICATIONS

Machine Translation, Suzuki et al., WO 2014/068889, May 2014.*
(Continued)

Primary Examiner — Michael E. La Villa
(74) Attorney, Agent, or Firm — Oliff PLC

(57) ABSTRACT

A high-strength galvanized steel sheet comprising a cold-rolled steel sheet, an intermetallic compound formed on the cold-rolled steel sheet, and a galvanizing layer formed on the intermetallic compound, the cold-rolled steel sheet having a specific composition and a microstructure having a martensite area ratio of 7% or more and less than 25% and a ferrite area ratio of 50% or more and which includes a base metal surface portion in which the amount of internal oxides per single side is 0.05 g/m² or less.

1 Claim, No Drawings

(51) Int. Cl.
 *C23C 30/00* (2006.01)
 *C23C 28/02* (2006.01)
 *C23C 2/28* (2006.01)
 *B32B 15/04* (2006.01)

(56) References Cited

FOREIGN PATENT DOCUMENTS

| | | |
|---|---|---|
| WO | 2013047812 A1 | 4/2013 |
| WO | 2014068889 A1 | 5/2014 |
| WO | 2014103279 A1 | 7/2014 |

OTHER PUBLICATIONS

Nov. 2, 2015 Search Report issued in International Patent Application No. PCTJP2015004136.
Jun. 29, 2017 Search Report issued in European Application No. 15850575.0.
Osawa, et al., "TS590~980 MPa Grade Low-Carbon Equivalent Type Galvannealed Sheet Steels with Superior Spot-Weldability," Kawasaki Steel Technical Report, No. 48, pp. 9-16, (Mar. 2003).

\* cited by examiner

HIGH-STRENGTH GALVANIZED STEEL SHEET

TECHNICAL FIELD

This application relates to a high-strength galvanized steel sheet for use in automotive inner panels.

BACKGROUND

In recent years, surface-treated steel sheets obtained by rustproofing base steel sheets, particularly galvanized steel sheets which can be manufactured at low cost and which are excellent in rust resistance, have been used in the fields of automobiles, home appliances, building materials, and the like. In particular, European and American carmakers are attempting to enhance rust prevention performance by the use of galvanized steel sheet which can be readily increased in coating thickness. High demand for automotive steel sheets can be expected in the East Asian region, which is remarkable in economic growth.

In the case of an automotive steel sheet strictly required to have good workability, if coating quality including post-pressing anti-impact adhesion and post-working, post-painting corrosion resistance is not good, then durability cannot be maintained. Hitherto, no galvanized steel sheet with sufficient coating quality has been capable of being provided.

In particular, severe workability and the rust resistance of a worked portion are required for a so-called high-strength steel sheet used as a strength member. Therefore, the worked portion is required to have excellent coating quality.

Patent Literature 1 discloses a method for manufacturing a galvanized steel sheet excellent in slidability in pressing by regulating the content of Al in a coating layer and the amount of Al at the interface between the coating layer and a steel sheet. However, a technique described in Patent Literature 1 does not sufficiently take into account coating quality including the anti-impact adhesion and post-painting corrosion resistance of a worked portion or coating appearance and therefore is required to be further improved.

CITATION LIST

Patent Literature

Patent Literature 1: Japanese Unexamined Patent Application Publication No. 2004-315965

SUMMARY

Problems to be Solved

The disclosed embodiments have been made in view of the foregoing circumstances. It is an object of the disclosed embodiments to provide a high-strength galvanized steel sheet excellent in the coating quality and coating appearance of a worked portion.

Solution to Problem

As a result of intensive investigations, the inventors have found that a high-strength galvanized steel sheet excellent in the coating quality and coating appearance of a pressed portion can be provided in such a manner that (1) an FeAl intermetallic compound is formed at a coating layer-steel sheet interface so as to have predetermined properties, (2) the solidification structure of a coating is controlled, (3) the texture of a surface is controlled, and (4) the state of internal oxidation in a surface portion of the steel sheet is controlled without simply performing galvanizing like a conventional technique, leading to the completion of the disclosed embodiments. The disclosed embodiments have been made on the basis of the above finding and are as summarized below.

[1] A high-strength galvanized steel sheet includes a cold-rolled steel sheet having a composition containing, by mass %, C: 0.06% or more and 0.09% or less, Si: 0.30% or less, Mn: 1.7% or more and 2.3% or less, P: 0.001% or more and 0.020% or less, S: 0.010% or less, Mo: 0.05% or more and 0.30% or less, N: 0.005% or less, and Al: 0.01% or more and 0.10% or less, the remainder being Fe and inevitable impurities, the cold-rolled steel sheet having a microstructure having a martensite area ratio of 7% or more and less than 25% and a ferrite area ratio of 50% or more, and including a base metal surface portion in which the amount of internal oxides per single side is 0.05 g/m$^2$ or less;

an intermetallic compound, formed on the cold-rolled steel sheet, containing Al of 0.12 g/m$^2$ or more and 0.22 g/m$^2$ or less and Fe$_2$Al$_5$ with an average grain size of less than 1.0 µm; and a galvanizing layer formed on the intermetallic compound. The galvanizing layer contains 0.3%≤Al %≤0.6% (Al % represents the content (mass percent) of Al in the galvanizing layer) and has a surface roughness Ra of 0.8 µm or more and 1.6 µm or less and a glossiness (G value) of 550 or more and 750 or less. In the galvanizing layer, the zinc basal plane orientation ratio Zn (002)/(004) defined by the equation (1) below is 60% or more and 90% or less.

[Math. 1]

$$Zn(002)/(004) = \{Zn \text{ crystal orientation of (002) plane}\} \times 100/\{Zn \text{ crystal orientation of (004) plane}\} \quad (1)$$

$$Zn \text{ crystal orientation of } (xyz) \text{ plane} = \frac{I_{(xyz)}/\Sigma I_{(xyz)}}{I_{std(xyz)}/\Sigma I_{std(xyz)}} \times 100$$

(where $I_{(xyz)}$ is the intensity of Zn in a (xyz) plane of a sample measured using an X-ray and $I_{std(xyz)}$ is the intensity of Zn in a (xyz) plane of a standard sample (pure Zn powder) measured using an X-ray).

In the disclosed embodiments, the term "high-strength galvanized steel sheet" refers to a steel sheet with a tensile strength (TS) of 590 MPa to 690 MPa.

Advantageous Effects

According to the disclosed embodiments, a high-strength galvanized steel sheet excellent in the coating quality and coating appearance of a worked portion is provided.

DETAILED DESCRIPTION

A high-strength galvanized steel sheet according to the disclosed embodiments has a specifically configured galvanizing layer placed on a specifically configured cold rolled steel sheet. An intermetallic compound having a specific configuration is formed between the cold-rolled steel sheet and the galvanizing layer. Therefore, the high-strength galvanized steel sheet according to the disclosed embodiments is excellent in the coating quality and coating appearance of a worked portion. In particular, the high-strength galvanized steel sheet according to the disclosed embodiments is excellent in the coating adhesion of a 60° bent portion in crashworthiness testing, post-painting corrosion resistance, and coating appearance.

The disclosed embodiments are described below in detail.

<Cold-Rolled Steel Sheet>

The cold-rolled steel sheet, which makes up the high-strength galvanized steel sheet according to the disclosed embodiments, has a composition containing C: 0.06% or more and 0.09% or less, Si: 0.30% or less, Mn: 1.7% or more and 2.3% or less, P: 0.001% or more and 0.020% or less, S: 0.010% or less, Mo: 0.05% or more and 0.30% or less, N: 0.005% or less, and Al: 0.01% or more and 0.10% or less, the remainder being Fe and inevitable impurities. Herein, reasons for limiting components of the cold-rolled steel sheet are first described. Incidentally, the unit "%" for each component in a steel sheet according to the disclosed embodiments refers to "mass percent" unless otherwise specified.

[C: 0.06% or More and 0.09% or Less]

C is one of important fundamental components of steel. In the disclosed embodiments, C is a particularly important element which affects the volume fraction of an austenite ($\gamma$) phase when steel is heated to a ($\alpha$ (ferrite)+$\gamma$ (austenite)) region and which also affects the amount of martensite after transformation. Mechanical properties such as strength depend significantly on the fraction of martensite and the hardness of a martensite phase. When the content of C is less than 0.06%, the martensite phase is unlikely to be formed. However, when the content of C is more than 0.09%, the spot weldability deteriorates. Therefore, the content of C is set to 0.06% or more and 0.09% or less.

[Si: 0.30% or Less]

Si is an element that reduces the amount of solute C in a ferrite ($\alpha$) phase to enhance workability such as elongation. Containing Si of more than 0.30% impairs coating quality. Therefore, the upper limit of the content of Si is set to 0.30%.

[Mn: 1.7% or More and 2.3% or Less]

Mn concentrates in the austenite ($\gamma$) phase, has the effect of promoting martensite transformation, and is an important element as a fundamental component in the disclosed embodiments. When the content of Mn is less than 1.7%, the effect is not obtained. However, when the content of Mn is more than 2.3%, the spot weldability and the coating quality are significantly impaired. Therefore, the content of Mn is set to 1.7% or more and 2.3% or less.

[P: 0.001% or More and 0.020% or Less]

P is an element effective in achieving high strength at low cost. In order to achieve high strength, the content of P is set to 0.001% or more. However, containing P of more than 0.020% significantly impairs spot weldability. Therefore, the upper limit of the content of P is set to 0.020%.

[S: 0.010% or Less]

S causes hot cracking during hot rolling and induces the nugget interior fracture of a spot weld; hence, the content thereof is preferably minimized. Thus, in the disclosed embodiments, the content of S is suppressed to 0.010% or less.

[Mo: 0.05% or More and 0.30% or Less]

Mo is an element important in obtaining a dual phase of ferrite and martensite without impairing coating quality. The content of Mo needs to be set to at least 0.05%. However, when Mo of more than 0.30% is contained, a further effect is little and an increase in manufacturing costs is caused. Therefore, the upper limit of the content of Mo is set to 0.30%.

[N: 0.005% or Less]

N causes aging deterioration and also causes an increase in yield point (yield ratio) and the occurrence of yield elongation. Therefore, the content of N needs to be suppressed to 0.005% or less.

[Al: 0.01% or More and 0.10% or Less]

Aluminium is an element which is effective as a deoxidizer in steelmaking steps and which is effective in fixing N, which causes aging deterioration, in the form of AlN. In order to sufficiently exhibit such an effect, the content of Al is set to 0.01% or more. However, containing Al of more than 0.10% causes an increase in manufacturing costs. Therefore, the content of Al needs to be suppressed to 0.10% or less.

In the steel sheet according to the disclosed embodiments, the remainder is Fe and inevitable impurities.

The above-mentioned cold-rolled steel sheet, which makes up the high-strength galvanized steel sheet according to the disclosed embodiments, has a specific microstructure and specific physical properties, which are described below in detail.

(Area Ratio of Martensite: 7% or More and Less than 25%)

In the cold-rolled steel sheet which makes up the high-strength galvanized steel sheet according to the disclosed embodiments, when the area ratio of martensite is less than 7%, the yield ratio YR increases significantly. However, when the area ratio of martensite is 25% or more, the local ductility decreases and therefore the elongation EL decreases. Thus, in the cold-rolled steel sheet which makes up the high-strength galvanized steel sheet according to the disclosed embodiments, the area ratio of martensite is set to 7% or more and less than 25%. The area ratio of martensite is preferably 7% or more and 22% or less and more preferably 7% or more and 20% or less. The area ratio of martensite can be adjusted in such a manner that the content of C in steel is mainly controlled to 0.06% or more and 0.09% or less and the heating temperature (which is the annealing temperature and refers to the maximum attained temperature of a steel sheet) during annealing is set to 730° C. or more and 880° C. or less.

(Area Ratio of Ferrite: 50% or More)

In the cold-rolled steel sheet which makes up the high-strength galvanized steel sheet according to the disclosed embodiments, when the area ratio of ferrite is less than 50%, the reduction of the total elongation EL is significant. Thus, the area ratio of ferrite is set to 50% or more. The area ratio of ferrite is preferably 60% or more. The area ratio of ferrite can be adjusted in such a manner that the content of C in steel is mainly controlled to 0.06% or more and 0.09% or less.

Herein, the area ratio of ferrite is the percentage of the area of the ferrite phase in the observed area and the area ratio of martensite is the percentage of the area of the martensite phase in the observed area. In actual fact, the area ratio of ferrite and the area ratio of martensite can be calculated as described below. That is, a cross section in a thickness direction of an obtained steel sheet is polished and is then corroded with 3% nital (an alcohol solution including nitric acid of 3%). The vicinity of one-fourth position in the thickness direction is observed at a magnification of about 1,500 using a SEM (scanning electron microscope) and an obtained image is analyzed using common image analysis software, whereby the area ratio of each phase can be determined. In an obtained grayscale image, ferrite is gray (base microstructure) and martensite can be identified as a microstructure exhibiting a white color.

(The Amount of Internal Oxides Per Single Side of a Base Metal Surface Portion on a Surface of the Cold-Rolled Steel Sheet is 0.05 g/m$^2$ or Less)

Controlling the state of internal oxidation in a steel sheet surface portion (base metal surface portion) allows a pressed portion of the high-strength galvanized steel sheet to have excellent coating adhesion and post-painting corrosion resistance in crashworthiness testing and also allows the pressed portion to have excellent spot weldability. In order to ensure good coating adhesion, the amount of internal oxides per single side of a base metal surface portion on a surface of the cold-rolled steel sheet needs to be 0.05 g/m$^2$ or less.

Internal oxidation occurs because oxidizable elements, such as Si, Mn, Al, and P, contained in a steel sheet are oxidized in a hot-rolling step, an annealing step in a CGL (continuous galvanizing line), or the like. In order to ensure that the amount of the internal oxides per single side of the base metal surface portion on the surface of the cold-rolled steel sheet is 0.05 g/m$^2$ or less, it is necessary that the coiling temperature during hot rolling is not excessively raised and the dew point in an annealing atmosphere in the CGL is not excessively raised. In order to avoid that rolls are deteriorated by the surface oxidation of the rolls, the appropriate range of the dew point preferably does not exceed 0° C. In order to enhance the descalability, the coiling temperature preferably does not exceed 700° C.

The above mentioned term "base metal surface portion on the surface of the cold-rolled steel sheet" refers to a surface portion in contact with the galvanizing layer and can be expressed as a steel sheet surface portion directly under a coating layer after the removal of the coating layer. The base metal surface portion, in which the amount of the internal oxides is regulated, corresponds to a range extending from the interface between the galvanizing layer and the steel sheet to 50 μm in a thickness direction of the steel sheet.

When the amount of the internal oxides per single side is more than 0.05 g/m$^2$, grain boundaries in a worked portion embrittle, the coating adhesion after working deteriorates, and the weldability also deteriorates.

The amount of the internal oxides can be determined by measuring the amount of oxygen in base metal steel after the removal of the coating layer. A method for removing the coating layer is not particularly limited and the coating layer can be removed with acid or alkali. However, it is to be noted that base metal is not removed using an inhibitor (base metal dissolution inhibitor) together and a surface of the base metal is not oxidized after removal. As an example, the coating layer can be removed with a combination of 195 cc of an aqueous solution containing 20 mass % NaOH and 10 mass % triethanolamine and 7 cc of an aqueous solution containing 35 mass % H$_2$O$_2$. In addition, the coating layer can be removed with a dilute HCl solution containing the inhibitor.

The amount of an oxide in steel can be measured by, for example, "impulse furnace fusion-infrared absorption spectrometry". In order to estimate the amount of the internal oxides directly under the coating layer, the amount of oxygen contained in a base material needs to be subtracted. Therefore, the amount of oxygen in steel is separately measured using a sample from which the coating layer has been similarly removed, the front and back surface portions of the sample being mechanically polished by 100 μm or more, and is then subtracted from the amount of oxygen in the sample from which the coating layer has been removed, whereby the increment of oxidation only in the surface portions is calculated, followed by obtaining a value in terms of the amount per unit area.

<Intermetallic Compound>

The configuration of the intermetallic compound, which is formed on the above-mentioned cold-rolled steel sheet, is described below.

[Al: 0.12 g/m$^2$ or More and 0.22 g/m$^2$ or Less]

The high-strength galvanized steel sheet according to the disclosed embodiments contains the intermetallic compound at the interface between the coating layer and the steel sheet and therefore the adhesion of the worked portion during crashworthiness testing is enhanced. The intermetallic compound contains Al of 0.12 g/m$^2$ or more and 0.22 g/m$^2$ or less and Fe$_2$Al$_5$ with an average grain size of less than 1.0 μm. In the high-strength galvanized steel sheet according to the disclosed embodiments, this enables the FeAl intermetallic compound to be formed at the interface between the coating layer and the steel sheet such that the FeAl intermetallic compound is fine and dense.

In order to ensure that the content of Al in the intermetallic compound is less than 0.12 g/m$^2$, the concentration of Al in a molten zinc bath for plating needs to be low. When the concentration of Al is too low, dross precipitates to deteriorate the appearance. On the other hand, in order to ensure that the content of Al in the intermetallic compound is more than 0.22 g/m$^2$, the concentration of Al in the molten zinc bath for plating needs to be high. When the concentration of Al is too high, a large amount of an oxide film of Al is formed on a surface of the coating layer to deteriorate the spot weldability.

(Average Grain Size of Fe$_2$Al$_5$: Less than 1.0 μm)

When the average grain size of Fe$_2$Al$_5$ is 1.0 μm or more, the FeAl intermetallic compound, which is hard, grows excessively. Therefore, the crashworthiness of the high-strength galvanized steel sheet according to the disclosed embodiments deteriorates. Therefore, the average grain size of Fe$_2$Al$_5$ is set to less than 1.0 μm.

The formation of the intermetallic compound depends on the activity of Al in the molten zinc bath and therefore can be increased by mainly increasing the concentration of Al. However, when the amount of Al is too large, the crashworthiness deteriorates as described above. Therefore, Al needs to be controlled to an appropriate amount.

The average grain size of Fe$_2$Al$_5$ can be adjusted by controlling the concentration of Al in a plating bath.

The average grain size is not particularly limited and can be measured by a measurement method adjusted at predetermined magnification using a scanning electron microscope (SEM).

<Galvanizing Layer>

The configuration of the galvanizing layer, which is formed on the above mentioned intermetallic compound by galvanizing a surface of the cold-rolled steel sheet, is described below.

[Zn and 0.3%≤Al %≤0.6%]

The galvanizing layer, which makes up the high-strength galvanized steel sheet according to the disclosed embodiments, contains Zn and 0.3%≤Al %≤0.6%. Herein, Al % represents the content (mass percent) of Al in the galvanizing layer. In order to ensure that Al is less than 0.3%, the concentration of Al in the molten zinc bath for plating needs to be low. When the concentration of Al therein is too low, Fe dissolves out and therefore dross precipitates to deteriorate the appearance. When Al is more than 0.6%, a large amount of an oxide film of Al is formed on a surface of a coating layer to deteriorate the spot weldability. The galvanizing layer may contain Pb, Sb, Mg, Ni, Mn, Si, Ti, Cr, Sr, and Ca.

(Surface Roughness Ra of Galvanizing Layer: 0.8 μm or More and 1.6 μm or Less)

When the surface roughness Ra of the galvanizing layer is less than 0.8 μm, oil is not held during pressing and therefore the press formability during working is poor. However, when Ra is more than 1.6 μm, the post-painting sharpness and the adhesion are poor. Therefore, Ra is set to 0.8 μm or more and 1.6 μm or less.

Ra is adjusted to an appropriate level in a skin pass treatment using highly roughened dull rolls. In a dull adjustment method, shot dull, EDT (electron discharged texturing), EBT (electron beam texturing), scratch dull, or working dull rolls are used. The Ra is not particularly limited and can be measured in accordance with JIS B 0601 (2001) using a roughness meter.

(Glossiness (G Value) of Galvanizing Layer Surface: 550 or More and 750 or Less) and (Zinc Basal Plane Orientation Ratio: Zn (002)/(004) is 60% or More and 90% or Less)

In the high-strength galvanized steel sheet according to the disclosed embodiments, in order to control the solidification structure of a coating, the glossiness (G value) is set to 550 or more and 750 or less and the zinc basal plane orientation ratio Zn (002)/(004) defined by the equation (1) below is set to 60% or more and 90% or less. Setting the zinc basal plane orientation ratio Zn (002)/(004) to 60% or more and 90% or less allows hcp (hexagonal close-packed) zinc to be readily oriented to a basal plane when hcp zinc is solidified.

[Math. 2]

$$Zn(002)/(004) = \{Zn \text{ crystal orientation of (002) plane}\} \times 100/\{Zn \text{ crystal orientation of (004) plane}\} \quad (1)$$

$$Zn \text{ crystal orientation of } (xyz) \text{ plane} = \frac{I_{(xyz)}/\Sigma I_{(xyz)}}{I_{std(xyz)}/\Sigma I_{std(xyz)}} \times 100$$

(where $I_{(xyz)}$ is the intensity of Zn in a (xyz) plane of a sample measured using an X-ray and $I_{std(xyz)}$ is the intensity of Zn in a (xyz) plane of a standard sample (pure Zn powder) measured using an X-ray).

For the solidification structure of the coating, when the concentration of Al in the bath is a certain value, the Fe—Al intermetallic compound is formed at the interface between the coating layer and the steel sheet and the solidification structure of zinc develops healthily. When the concentration of Al is too high, the solidification structure is dendritically formed and therefore many surface irregularities are present. Hence, the glossiness (G value) decreases to less than 550. In contrast, when the concentration of Al is low, the formation of the Fe—Al intermetallic compound at the interface is suppressed and a Fe—Zn alloy layer develops. This increases the number of base points of Zn solid nuclei and therefore the solidification structure is fine and smooth; hence, the glossiness (G value) increases unnecessarily to exceed 750. The case where the glossiness (G value) is less than 550 corresponds to the excess addition of Al to the zinc bath, resulting in that the spot weldability deteriorates. The case where the glossiness (G value) is more than 750 corresponds to the small addition of Al to the zinc bath, resulting in that Fe dissolves out to cause surface defects due to dross.

The glossiness (G value) is not particularly limited and can be measured in accordance with JIS Z 8741 (1997) using a glossmeter. Desired surface properties can be ensured in such a manner that the texture is controlled by skin pass or the like.

When the zinc basal plane orientation ratio Zn (002)/(004) is less than 60%, the crystal size of zinc solidifying immediately after plating is fine in the case where the orientation of zinc crystals is relatively random. Therefore, the steel sheet is too flat to hold oil during pressing and is poor in formability. When the zinc basal plane orientation ratio is more than 90%, the orientation of basal planes of Zn crystals is too high and therefore crystal grains are likely to grow. As a result, dendrite arms develop. Therefore, not only the post-painting sharpness is poor but the corrosion resistance is also poor. The zinc basal plane orientation ratio Zn (002)/(004) is not particularly limited and can be determined by measuring the X-ray diffraction intensity.

Zn has an hcp structure and is usually likely to be oriented to a basal plane. The measurement of the zinc basal plane orientation ratio represented by the equation (1) shows how much crystals are randomly oriented. The degree of orientation of the solidification structure affects the gloss, the crystal size, and the surface roughness. Therefore, accurately controlling the zinc basal plane orientation ratio is very important in controlling not only surface properties of the high-strength galvanized steel sheet but also the press formability thereof. The orientation is adjusted in such a manner that an appropriate amount of the Fe—Al alloy layer at the plating layer-steel sheet interface is ensured and the formation of the Fe—Zn alloy layer serving as a precipitation nucleus of zinc solidification structure is suppressed.

(Tensile Strength (TS): 590 MPa or More and 690 MPa or Less)

In the high-strength galvanized steel sheet according to the disclosed embodiments, the tensile strength (TS) is set to 590 MPa or more and 690 MPa or less for the purpose of mainly ensuring the strength of inner panels. Such a high-strength galvanized steel sheet with a tensile strength (TS) of 590 MPa or more and 690 MPa or less can be obtained in such a manner that a material containing steel sheet components in the disclosed embodiments is processed in a CGL under appropriate annealing conditions. The annealing temperature is preferably set to a temperature of about 800° C. to 850° C. for the annealing in a two-phase region.

[Coating Adhesion (Anti-Impact Adhesion) and Post-Painting Corrosion Resistance of Worked Portion in Crashworthiness Testing]

A 90° bent portion is intended for the purpose of simulating the work of a worked portion such as an automotive side member by the impact of an automobile crash. This portion is investigated for crashworthiness using a so-called DuPont tester and is evaluated by tape peeling. The post-painting corrosion resistance is evaluated in such a manner that the bent portion is subjected to chemical conversion coating, electrodeposition coating, and cross cutting and is then evaluated for swelling corrosion width by an SST test. If the amount of the Fe—Al intermetallic compound at the interface can be ensured beyond necessity as described above, then good coating adhesion (anti-impact adhesion) can be ensured.

<Method for Manufacturing High-Strength Galvanized Steel Sheet>

Subsequently, a method for manufacturing the high-strength galvanized steel sheet is described. The high-strength galvanized steel sheet can be manufactured by, for example, a method below. First, steel having the above composition is continuously cast into a slab. The slab is heated, is descaled, and is roughly rolled. Next, after being cooled, the slab is finish-rolled to form a steel sheet. The steel sheet is cooled, is coiled, is pickled, and is then cold-rolled. Next, the steel sheet is annealed and galvannealed in a continuous galvanizing line.

The heating time for heating the slab, the heating temperature, rough rolling conditions, cooling conditions, finish rolling conditions, coiling conditions, and the like can be appropriately set on the basis of common general technical knowledge. In the disclosed embodiments, in order to adjust the amount of the internal oxides in the base metal surface portion to the above range, finish rolling (hot rolling) conditions and the coiling temperature are preferably adjusted.

Conditions for annealing the steel sheet affect the yield stress of the high-strength galvanized steel sheet. In the disclosed embodiments, in order to set the tensile strength to the above range, the heating temperature (which is the annealing temperature and refers to the maximum attained temperature of the steel sheet) during annealing is set to 730° C. or more and 880° C. or less and is preferably set to 800° C. or more and 850° C. or less.

An annealing atmosphere may be appropriately adjusted. In the disclosed embodiments, the dew point is preferably adjusted to 0° C. or lower. Adjusting the dew point to a temperature higher than 0° C. is not preferable because the surface of a furnace body is likely to be embrittled.

The concentration of hydrogen in the annealing atmosphere is preferably 1 volume % or more and 50 volume % or less. The concentration of hydrogen is preferably 1 volume % or more because a surface of the steel sheet is activated. A hydrogen concentration of more than 50 volume % is economically disadvantageous and therefore is not preferable. The annealing atmosphere usually contains $N_2$ in addition to hydrogen. Inevitably contained components include $CO_2$, $CO$, $O_2$, and the like.

In the disclosed embodiments, in order to control the content of Al in the galvanizing layer to allow an intermetallic compound to be present between the steel sheet and the galvanizing layer, galvanizing conditions need to be adjusted. Furthermore, in order to adjust the surface condition (surface roughness Ra, glossiness (G value), and zinc basal plane orientation ratio) of the galvanizing layer to a desirable level, the galvanizing conditions also need to be adjusted. The galvanizing conditions are described below.

The dipped sheet temperature that is the temperature of the steel sheet when the annealed steel sheet is dipped in the plating bath is not particularly limited and is preferably not lower than a temperature 20° C. lower than the temperature of the plating bath (bath temperature) or higher than a temperature 20° C. higher than the bath temperature. When the dipped sheet temperature is within the above range, the change of the bath temperature is small and a desired galvanizing treatment is likely to be continuously performed. The content of Al in the galvanizing layer and the content of Al in the intermetallic compound tend to be reduced by raising the bath temperature. The surface glossiness of the galvanizing layer tends to be increased by raising the bath temperature.

The composition of the plating bath, in which the annealed steel sheet is dipped, may contain Al in addition to Zn and may contain another component as required. The concentration of Al in the plating bath is not particularly limited and is preferably 0.16 mass % or more and 0.25 mass % or less, because a Fe—Al alloy phase is formed and a Fe—Zn phase is suppressed when the concentration of Al is within the above range. The glossiness can be adjusted depending on the concentration of Al in the plating bath. When the concentration of Al in the plating bath is low, crystals of not Fe—Al but Fe—Zn are slightly formed at the interface. The Fe—Zn crystals serve as sites for producing Zn solidified nuclei to produce a large number of zinc crystals. The randomization of the orientation of the zinc crystals tends to reduce the orientation ratio. As a result, as the concentration of Al is lower, the growth of dendritic Zn crystals is more suppressed and the number of surface irregularities is more reduced, leading to smoothing. Therefore, the glossiness increases. The concentration of Al is more preferably 0.19 mass % or more and 0.22% or less. Since the concentration of Al affects the content of Al in the galvanizing layer and the content of Al in the intermetallic compound, the concentration of Al is preferably determined in consideration of these contents.

The temperature of the plating bath (bath temperature) is not particularly limited and is preferably 430° C. or more and 470° C. or less. The bath temperature is preferably 430° C. or higher because a zinc bath melts stably without solidifying. The bath temperature is preferably 470° C. or lower because the dissolution of Fe is slight and the number of dross defects is reduced. The bath temperature is more preferably 450° C. or more and 465° C. or less.

The dipping time for which the steel sheet is dipped in the plating bath is not particularly limited and is preferably 0.1 seconds or more and 5 seconds or less. When the dipping time is within the above range, the galvanizing layer is likely to be formed on a surface of the steel sheet as desired.

The coating weight is adjusted by gas jet wiping or the like immediately after the steel sheet is pulled out of the plating bath. In the disclosed embodiments, the coating weight is not particularly limited and is preferably in a range of 20 g/m$^2$ or more and 120 g/m$^2$ or less. When the coating weight is less than 20 g/m$^2$, it is difficult to ensure the corrosion resistance in some cases. However, when the coating weight is more than 120 g/m$^2$, the exfoliation resistance deteriorates in some cases.

After the coating weight is adjusted as described above, temper rolling (SK treatment) is performed. The type of rolls used in the SK treatment is not particularly limited and electro-discharge texture rolls (EDT rolls), electron beam texture rolls (EBT rolls), shot dull rolls, Topochrome rolls, and the like can be used.

The rolling reduction during the SK treatment (SK rolling reduction (%)) is not particularly limited and is preferably 0.7% to 0.9%. When the SK rolling reduction is within the above range, the surface roughness is likely to be adjusted to the above preferable range. When the SK rolling reduction is outside the above range, a dull pattern holding lubricating oil is not formed and the press formability is reduced in some cases. Furthermore, the yield strength is also reduced in some cases.

The cooling rate of the steel sheet pulled out of the plating bath is preferably −5° C./s or higher and −30° C./s or lower.

The high-strength galvanized steel sheet according to the disclosed embodiments has been described above. The use of high-strength galvanized steel sheet according to the disclosed embodiments is described below.

The high-strength galvanized steel sheet according to the disclosed embodiments is excellent in post-pressing, post-painting corrosion resistance and therefore is preferably used for applications in which a coating film is formed on a surface of the galvanizing layer. Even if the high-strength galvanized steel sheet according to the disclosed embodiments is used for applications in which severe workability is required, the corrosion resistance and mechanical properties thereof are not significantly reduced because the coating adhesion thereof is excellent. Applications in which severe workability is required and in which the coating film is formed include automotive steel sheets for automotive outer panels and inner panels and the like. A method for forming the coating film is not particularly limited and it is preferable that after a chemical conversion coating is formed by subjecting a surface of the galvanizing layer to a chemical conversion treatment, the coating film is formed on the chemical conversion coating.

Both a coating-type and a reaction-type chemical conversion treatment solution can be used. Components contained in a chemical conversion treatment solution are not particularly limited. A chromating solution may be used. A chromium-free chemical conversion treatment solution may be used. The chemical conversion coating may be composed of a single layer or multiple layers.

A coating method for forming the coating film is not particularly limited. Examples of the coating method include electrodeposition coating, roll coater coating, curtain flow coating, and spray coating. Means such as hot-air drying, infrared heating, and induction heating can be used to dry paint.

EXAMPLES

The disclosed embodiments are described below in detail with reference to examples. The disclosed embodiments are not limited to the examples.

Hot-rolled steel sheets having a composition shown in Table 1 were manufactured by coiling at a coiling temperature of 650° C. or lower. Mill scales were removed from the hot-rolled steel plates by pickling and the hot-rolled steel sheets were cold-rolled at a cold-rolling reduction of 50%, whereby cold-rolled materials having a thickness of 1.2 mm or 2.3 mm were manufactured. Thereafter, surfaces thereof were degreased, followed by annealing and galvanizing under conditions shown in Table 2. The line speed (LS) was 60 mpm or 100 mpm. The temperature of a bath and the concentration of Al in the bath were appropriately varied. After the coating weight was adjusted, temper rolling (SK treatment) was performed. Rolls used in the SK treatment were EDT rolls. The rolling reduction was appropriately varied. The coating weight per single side was 55 g/m². Results are shown in Table 2.

In accordance with JIS Z 8741 (1997), the 60-degree relative-specular glossiness (G value) was measured with a glossmeter.

The Zn crystal orientation of the (002) plane and the Zn crystal orientation of the (004) plane were measured with an X-ray by a θ-2θ scanning method using an X-ray diffractometer, whereby the zinc basal plane orientation ratio Zn (002)/(004) of a surface of each galvanizing layer was determined.

In accordance with JIS B 0601 (2001), the surface roughness Ra of the galvanizing layer was measured with a roughness meter.

The content of Al in the galvanizing layer, which was peeled off with dilute hydrochloric acid containing an inhibitor, was determined by ICP emission spectrometry.

As the composition of an intermetallic compound, the amount of a FeAl-enriched layer (the total mass of a $Fe_2Al_5$ alloy layer) was determined in such a manner that a zinc coating layer was peeled off with fuming nitric acid and the amount of the FeAl-enriched layer was determined from Al by ICP emission spectrometry.

The average grain size of $Fe_2Al_5$ making up the intermetallic compound was measured by observation at a magnification of 5,000 using a scanning electron microscope (SEM).

For the composition of the intermetallic compound, whether the intermetallic compound was $Fe_2Al_5$ was judged by thin-film X-ray diffraction.

The amount of internal oxides was obtained by measuring the amount of oxygen in base metal steel after the removal of the coating layer. The amount of an oxide in steel was measured by "impulse furnace fusion-infrared absorption spectrometry". In order to estimate the amount of the internal oxides directly under the coating layer, the amount of oxygen contained in a base material needs to be subtracted. Therefore, the amount of oxygen in steel was separately measured using a sample from which the coating layer had been similarly removed, the front and back surface portions of the sample being mechanically polished by 100 μm or more, and was then subtracted from the amount of oxygen in the sample from which the coating layer had been removed, whereby the increment of oxidation only in the surface portions was calculated, followed by obtaining the value of the internal oxides in terms of the amount per unit area.

The area ratio of ferrite and the area ratio of martensite were measured. First, a cross section in a thickness direction

TABLE 1

| Steel type No. | C | Si | Mn | P | S | Mo | N | Al | Remarks (mass percent) |
|---|---|---|---|---|---|---|---|---|---|
| A | 0.08 | 0.01 | 2.0 | 0.011 | 0.004 | 0.15 | 0.002 | 0.04 | Example |
| B | 0.09 | 0.25 | 1.8 | 0.015 | 0.005 | 0.25 | 0.001 | 0.03 | Example |
| C | 0.07 | 0.03 | 2.3 | 0.007 | 0.003 | 0.10 | 0.004 | 0.06 | Example |
| D | 0.08 | 0.60 | 2.0 | 0.011 | 0.004 | 0.15 | 0.002 | 0.04 | Comparative example |
| E | 0.08 | 0.01 | 2.1 | 0.011 | 0.004 | 0.05 | 0.002 | 0.04 | Example |
| F | 0.005 | 0.02 | 1.9 | 0.011 | 0.004 | 0.15 | 0.002 | 0.04 | Comparative example |
| G | 0.08 | 0.01 | 0.1 | 0.011 | 0.004 | 0.15 | 0.002 | 0.04 | Comparative example |
| H | 0.08 | 0.05 | 1.9 | 0.11 | 0.004 | 0.15 | 0.002 | 0.04 | Comparative example |

For obtained high-strength galvanized steel sheets, as appearance (coating appearance), the case where no appearance defects such as coating irregularities were present was visually judged to be good (A) and the case where such appearance defects were present was visually judged to be poor (B).

of each obtained steel sheet was polished and was then corroded with 3% nital (an alcohol solution including nitric acid of 3%). The vicinity of a through-thickness one-fourth position was observed at a magnification of about 1,500 using a SEM (scanning electron microscope) and an obtained image was analyzed using image analysis software, whereby the area ratio of each phase was determined. In an obtained grayscale image, ferrite was gray (base microstructure) and martensite was identified as a microstructure exhibiting a white color.

For the anti-impact adhesion of a worked portion, each sample with a length of 80 mm and a width of 30 mm was 60° bent at a 40 mm position in a longitudinal direction at a bend R of 1.5 mm, was subjected to crashworthiness testing in such a manner that a 1,843 g punch with a core diameter of ⅝ inches was dropped on the convex outside of the bent portion from a height of 1 m, and was measured for exfoliation by peeling a Nichiban tape. One having a peeled portion was rated B and one having no peeled portion was rated A.

A: Good in adhesion
B: Poor in adhesion

Portions subjected to the same working treatment were subjected to general painting including chemical conversion coating, electrodeposition coating, intermediate coating, and over coating and were then investigated for post-painting corrosion resistance. Salt spray testing was performed for 10 days in accordance with JIS Z 2371 (2000), followed by evaluating whether a significant swell was present on the outside of each bent portion.

Good (A): No swell was present.
Poor (B): A swell was present.

A JIS No. 5 tensile test specimen was taken from each sample in a 90° direction to the rolling direction and was subjected to tensile testing at a constant cross-head speed of 10 mm/min in accordance with JIS Z 2241, whereby the tensile strength (TS (MPa)) was measured.

TABLE 2

| | | | | | Manufacturing conditions CGL | | | | | |
|---|---|---|---|---|---|---|---|---|---|---|
| Category | No | Steel type | Sheet thickness/ mm | CGL LS (mpm) | Annealing temperature (° C.) | $H_2$ concentration (volume percent) | Dew point (° C.) | Bath temperature (° C.) | Al concentration (mass percent) | SK/% | SK roll |
| Example | 1 | A | 1.2 | 100 | 800 | 5 | −42 | 450 | 0.19 | 1 | EDT |
| Example | 2 | A | 2.3 | 60 | 740 | 10 | −45 | 450 | 0.19 | 1 | EDT |
| Example | 3 | A | 1.2 | 100 | 810 | 5 | −38 | 450 | 0.23 | 1 | EDT |
| Example | 4 | A | 1.2 | 100 | 790 | 8 | −45 | 460 | 0.19 | 1 | EDT |
| Example | 5 | A | 1.2 | 100 | 820 | 5 | −51 | 450 | 0.19 | 0.9 | EDT |
| Example | 6 | A | 1.2 | 100 | 780 | 8 | −37 | 450 | 0.19 | 1.1 | EDT |
| Comparative example | 7 | A | 1.2 | 100 | 700 | 5 | −33 | 480 | 0.15 | 1 | EDT |
| Comparative example | 8 | A | 1.2 | 100 | 800 | 5 | 2 | 450 | 0.19 | 1 | EDT |
| Comparative example | 9 | A | 1.2 | 100 | 800 | 6 | −40 | 450 | 0.19 | 0.1 | EDT |
| Comparative example | 10 | A | 1.2 | 100 | 800 | 5 | −38 | 450 | 0.26 | 1 | EDT |
| Comparative example | 11 | A | 1.2 | 100 | 800 | 5 | −37 | 450 | 0.19 | 1.5 | EDT |
| Example | 12 | B | 1.2 | 100 | 810 | 5 | −38 | 450 | 0.19 | 0.8 | EDT |
| Example | 13 | C | 1.2 | 60 | 750 | 5 | −37 | 450 | 0.19 | 0.9 | EDT |
| Comparative example | 14 | D | 1.2 | 100 | 800 | 5 | −44 | 450 | 0.19 | 0.9 | EDT |
| Example | 15 | E | 1.2 | 100 | 800 | 5 | −43 | 450 | 0.19 | 1 | EDT |
| Comparative example | 16 | F | 1.2 | 100 | 800 | 5 | −43 | 450 | 0.19 | 1 | EDT |
| Comparative example | 17 | G | 1.2 | 100 | 800 | 5 | −43 | 450 | 0.19 | 1 | EDT |
| Comparative example | 18 | H | 1.2 | 100 | 800 | 5 | −43 | 450 | 0.19 | 1 | EDT |

| | | Product microstructure | | | | | |
|---|---|---|---|---|---|---|---|
| | | Coating layer | Intermetallic compound | | | Base metal Amount of | Surface |
| Category | No | Al % (mass percent) | FeAl IMC as Al (g/m$^2$) | Grain size (μm) | Main composition | internal oxides (g/m$^2$) | roughness Ra (μm) |
| Example | 1 | 0.4 | 0.17 | 0.5 | $Fe_2Al_5$ | 0.01 | 1.1 |
| Example | 2 | 0.4 | 0.16 | 0.6 | $Fe_2Al_5$ | 0.01 | 1.1 |
| Example | 3 | 0.5 | 0.21 | 0.7 | $Fe_2Al_5$ | 0.03 | 1.1 |
| Example | 4 | 0.4 | 0.15 | 0.4 | $Fe_2Al_5$ | 0.01 | 1.1 |
| Example | 5 | 0.4 | 0.17 | 0.5 | $Fe_2Al_5$ | 0.01 | 0.9 |
| Example | 6 | 0.4 | 0.17 | 0.6 | $Fe_2Al_5$ | 0.01 | 1.3 |
| Comparative example | 7 | 0.2 | 0.10 | 0.3 | $Fe_2Al_5$ | 0.01 | 1.1 |
| Comparative example | 8 | 0.4 | 0.17 | 0.3 | $Fe_2Al_5$ | 0.10 | 1.0 |
| Comparative example | 9 | 0.4 | 0.16 | 0.2 | $Fe_2Al_5$ | 0.01 | 0.4 |
| Comparative example | 10 | 0.7 | 0.31 | 1.1 | $Fe_2Al_5$ | 0.01 | 1.1 |

TABLE 2-continued

| Category | No | | | | | | |
|---|---|---|---|---|---|---|---|
| Comparative example | 11 | 0.4 | 0.17 | 0.6 | Fe$_2$Al$_5$ | 0.01 | 1.8 |
| Example | 12 | 0.4 | 0.18 | 0.5 | Fe$_2$Al$_5$ | 0.02 | 1.1 |
| Example | 13 | 0.4 | 0.17 | 0.3 | Fe$_2$Al$_5$ | 0.01 | 0.9 |
| Comparative example | 14 | 0.4 | 0.16 | 0.5 | Fe$_2$Al$_5$ | 0.01 | 1.1 |
| Example | 15 | 0.4 | 0.17 | 0.4 | Fe$_2$Al$_5$ | 0.01 | 1.1 |
| Comparative example | 16 | 0.4 | 0.17 | 0.4 | Fe$_2$Al$_5$ | 0.01 | 1.1 |
| Comparative example | 17 | 0.4 | 0.17 | 0.4 | Fe$_2$Al$_5$ | 0.01 | 1.1 |
| Comparative example | 18 | 0.4 | 0.17 | 0.4 | Fe$_2$Al$_5$ | 0.01 | 1.1 |

| | | | Product microstructure | | | Product properties | | | |
|---|---|---|---|---|---|---|---|---|---|
| | | | Solidification structure | Microstructure | | Coating quality of conical stretch | | | |
| Category | No | Glossiness | (002)/(004) orientation ratio (%) | Martensite area ratio (%) | Ferrite area ratio (%) | Anti-impact adhesion | Post-painting corrosion resistance | Mechanical property TS (MPa) | Coating appearance |
| Example | 1 | 650 | 75 | 12 | 80 | A | A | 610 | A |
| Example | 2 | 650 | 75 | 18 | 75 | A | A | 635 | A |
| Example | 3 | 700 | 70 | 10 | 83 | A | A | 620 | A |
| Example | 4 | 650 | 75 | 11 | 80 | A | A | 635 | A |
| Example | 5 | 710 | 68 | 14 | 80 | A | A | 614 | A |
| Example | 6 | 630 | 75 | 15 | 75 | A | A | 631 | A |
| Comparative example | 7 | 800 | 50 | 4 | 85 | B | B | 700 | B |
| Comparative example | 8 | 770 | 55 | 12 | 75 | B | B | 641 | A |
| Comparative example | 9 | 510 | 91 | 11 | 83 | B | B | 632 | A |
| Comparative example | 10 | 550 | 65 | 14 | 80 | B | A | 609 | A |
| Comparative example | 11 | 650 | 75 | 15 | 80 | B | A | 610 | A |
| Example | 12 | 640 | 75 | 21 | 75 | A | A | 635 | A |
| Example | 13 | 650 | 73 | 11 | 80 | A | A | 614 | A |
| Comparative example | 14 | 660 | 75 | 19 | 74 | B | A | 680 | A |
| Example | 15 | 650 | 75 | 15 | 80 | A | A | 612 | A |
| Comparative example | 16 | 650 | 75 | 2 | 90 | B | A | 580 | A |
| Comparative example | 17 | 650 | 75 | 11 | 75 | B | A | 540 | A |
| Comparative example | 18 | 650 | 75 | 14 | 80 | B | A | 641 | B |

As is clear from Table 2, high-strength galvanized steel sheets according to the disclosed embodiments had extremely good properties, suffered no exfoliation, and were excellent in anti-impact adhesion though the high-strength galvanized steel sheets were pressed. The high-strength galvanized steel sheets had good post-painting corrosion resistance. Furthermore, the high-strength galvanized steel sheets had good coating appearance.

The invention claimed is:

1. A high-strength galvanized steel sheet comprising a cold-rolled steel sheet, an intermetallic compound formed on the cold-rolled steel sheet, and a galvanizing layer formed on the intermetallic compound, the cold-rolled steel sheet having a composition comprising, by mass %:
C: 0.06% or more and 0.09% or less;
Si: 0.30% or less;
Mn: 1.7% or more and 2.3% or less;
P: 0.001% or more and 0.020% or less;
S: 0.010% or less;
Mo: 0.05% or more and 0.30% or less;
N: 0.005% or less;
Al: 0.01% or more and 0.10% or less; and
the remainder being Fe and inevitable impurities,
wherein the cold-rolled steel sheet (i) has a microstructure having a martensite area ratio in a range of 7% to less than 25% and a ferrite area ratio of 50% or more, and (ii) includes a base metal surface portion in which an amount of internal oxides per single side is 0.05 g/m$^2$ or less on an oxygen basis,
the intermetallic compound comprises Al in a range of 0.12 g/m$^2$ or more and 0.22 g/m$^2$ or less and Fe$_2$Al$_5$ with an average grain size of less than 1.0 μm,
the galvanizing layer comprises 0.3% Al % 0.6%, where Al % represents the content (by mass %) of Al in the galvanizing layer, the galvanizing layer having a surface roughness Ra in a range of 0.8 μm or more and 1.6 μm or less, the galvanizing layer having a glossiness (G value) in a range of 550 or more and 750 or less,
and in the galvanizing layer, the zinc basal plane orientation ratio Zn (002)/(004) is in a range of 60% or more and 90% or less, Zn (002)/(004) being defined by equation (1):

$$Zn(002)/(004) = \{Zn \text{ crystal orientation of } (002) \text{ plane}\} \times 100/\{Zn \text{ crystal orientation of } (004) \text{ plane}\} \quad (1)$$

$$Zn \text{ crystal orientation of } (xyz) \text{ plane} = \frac{I_{(xyz)}/\Sigma I_{(xyz)}}{I_{std(xyz)}/\Sigma I_{std(xyz)}} \times 100$$

where $I_{(xyz)}$ is an intensity of Zn in a (xyz) plane of a sample measured using an X-ray and $I_{std(xyz)}$ is an intensity of Zn in a (xyz) plane of a standard sample of pure Zn powder measured using an X-ray.

* * * * *